(12) United States Patent
Jeon et al.

(10) Patent No.: US 9,411,166 B2
(45) Date of Patent: Aug. 9, 2016

(54) DISPLAY DEVICE

(71) Applicant: LG CHEM, LTD., Seoul (KR)

(72) Inventors: Byoung Kun Jeon, Daejeon (KR); Su Young Ryu, Daejeon (KR); Moon Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 5 days.

(21) Appl. No.: 14/329,690

(22) Filed: Jul. 11, 2014

(65) Prior Publication Data

US 2014/0320773 A1    Oct. 30, 2014

Related U.S. Application Data (63) Continuation of application No. PCT/KR2013/001016, filed on Feb. 7, 2013.

(30) Foreign Application Priority Data

Feb. 7, 2012    (KR) .................. 10-2012-0012106
Feb. 7, 2013    (KR) .................. 10-2013-0014004

(51) Int. Cl.
*G02F 1/1335*    (2006.01)
*G02F 1/13*    (2006.01)
*G02B 27/22*    (2006.01)
*G02B 1/04*    (2006.01)
*G02B 27/26*    (2006.01)
*G02F 1/137*    (2006.01)
*G02F 1/29*    (2006.01)

(52) U.S. Cl.
CPC ............ *G02B 27/2214* (2013.01); *G02B 1/041* (2013.01); *G02B 27/225* (2013.01); *G02B 27/26* (2013.01); *G02F 1/13718* (2013.01); *G02F 1/133526* (2013.01); *G02F 2001/133562* (2013.01); *G02F 2001/294* (2013.01); *G02F 2203/07* (2013.01)

(58) Field of Classification Search
CPC ................... G02F 1/13718; G02F 1/133526
See application file for complete search history.

(56) References Cited

U.S. PATENT DOCUMENTS

| | | |
|---|---|---|
| 6,678,024 B2 | 1/2004 | Kim |
| 7,760,430 B2 | 7/2010 | Shestak et al. |
| 2007/0195410 A1 | 8/2007 | Yun et al. |

FOREIGN PATENT DOCUMENTS

| | | |
|---|---|---|
| CN | 1510492 | 7/2004 |
| CN | 1666142 A | 9/2005 |
| CN | 1221836 C | 10/2005 |
| CN | 101025490 A | 8/2007 |
| CN | 101114055 | 1/2008 |
| CN | 101118316 | 2/2008 |
| CN | 102156565 A | 8/2011 |
| JP | 2011-164527 | 8/2011 |
| KR | 10-2008-0084527 | 9/2008 |
| KR | 10-2008-0105549 | 12/2008 |
| KR | 10-2009-0065934 | 6/2009 |
| KR | 10-2010-0137725 A | 12/2010 |
| TW | 201105111 A1 | 2/2011 |

OTHER PUBLICATIONS

Giovanni Carbone, et al.: "Uniform Lying Helix Alignment on Periodic Surface Relief Structure Generated via Laser Scanning Lithography", Molecular Crystals and Liquid Crystals, XP055203408, vol. 544, No. 1, Jun. 30, 2011, pp. 37-48.

*Primary Examiner* — Wen-Ying P Chen
(74) *Attorney, Agent, or Firm* — Dentons US LLP (57) ABSTRACT

Provided is a display device. An illustrative display device of the present application may display three-dimensional images or two-dimensional images, which may be enjoyed without glasses.

5 Claims, 4 Drawing Sheets

|    |    |    |    |    |
|----|----|----|----|----|
| UR | UL | UR | UL | UR |

Fig. 4

| UR | UL | UR | UL | UR |
|----|----|----|----|----|
| UL | UR | UL | UR | UL |
| UR | UL | UR | UL | UR |
| UL | UR | UL | UR | UL |
| UR | UL | UR | UL | UR |

DISPLAY DEVICE

This application is a Continuation Bypass of International Application PCT/KR2013/001016, with an international filing date of Feb. 7, 2013 which claims priority to and the benefit of Korean Patent Application No. 10-2012-0012106, filed on Feb. 7, 2012, and Korean Patent Application No. 10-2013-0014004, filed on Feb. 7, 2013, all of which are incorporated herein by reference in their entirety.

FIELD

The present application relates to a display device.

BACKGROUND

Generally, display devices display two-dimensional images. Recently, as the demand for three-dimensional images increases in the fields, such as games or movies, and the like, display devices displaying three-dimensional images have been developed. A pair of two-dimensional images is input into two eyes of an observer, and the input images are merged in the brain of the observer, thereby recognizing a three-dimensional image.

Stereoscopic display devices (hereinafter, referred to as 3D devices) may be classified into a stereo-scopic type and an auto stereo-scopic type according to whether an observer needs to wear special glasses. In auto stereo-scopic devices, a parallex barrier method described in Patent Document 1 or a lenticular lens method described in Patent Document 2, and the like are usually used.

PRIOR ART DOCUMENT

Patent Document

Korean Patent Publication No. 10-2005-0119140
Korean Patent Publication No. 10-2003-0088244

DESCRIPTION

Object

The present application is directed to providing a display device.

Solution

One aspect of the present application provides a display device including a display element and a liquid crystal panel. The device may be a device that may display both two-dimensional images (2D images) and three-dimensional images (3D images).

Figure 1:
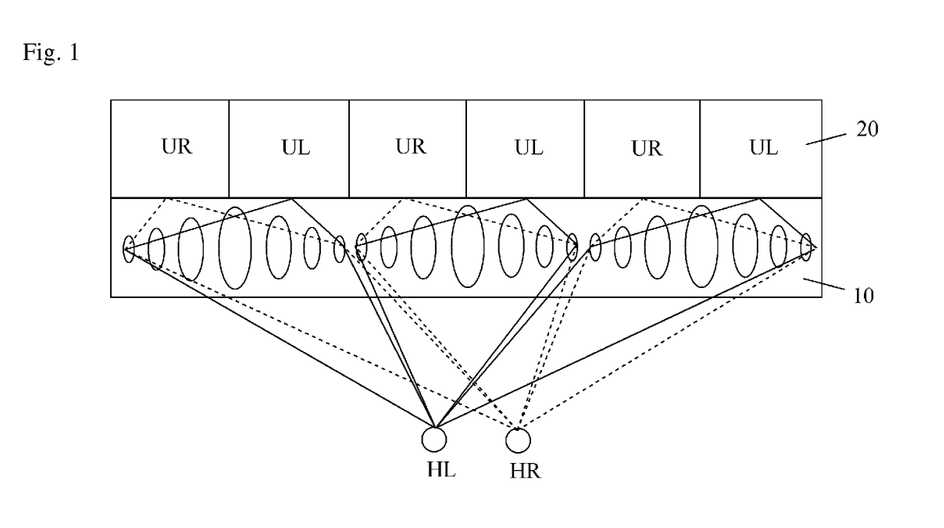
FIG. 1 shows a schematic of an illustrative embodiment of the driving state where the illustrative display device shows three-dimensional images.
Figure 2:
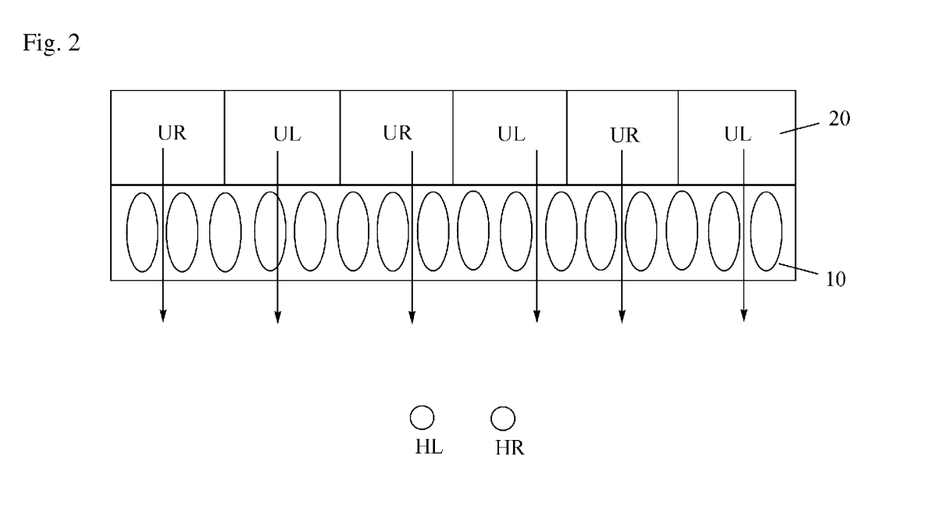
FIG. 2 shows a schematic of an illustrative embodiment of the driving state where the illustrative display device shows two-dimensional images.

The device may include a display element 20 and a liquid crystal lens panel 10, as in FIG. 1 or FIG. 2. Also, the device may additionally include a polarizer between the display element and the liquid crystal lens panel. Furthermore, the device may additionally include a polarizer and a light source, which are sequentially disposed on a side opposite to the liquid crystal lens panel of the display element. Hereinafter, in the present specification, for convenience of description, the polarizer disposed between the light source and the display element will be referred to as a first polarizer, and the polarizer disposed on a side opposite to the first polarizer will be referred to as a second polarizer.

The first and second polarizers included in the device are optical elements, in which a transmission axis and an absorption axis which is perpendicular to the transmission axis are formed. When light is incident to a polarizer, the polarizer may transmit only light having a polarization axis parallel to the transmission axis direction of the polarizer among the incident light. In the present specification, when terms used to define angles, such as vertical, parallel, perpendicular, horizontal, and the like, these terms mean substantially vertical, parallel, perpendicular, or horizontal within a range that does not damage a desired effect, and include an error in consideration of, for example, fabrication error or variation, and the like. For example, the term may include an error within about ±15 degrees, an error within about ±10 degrees, or an error within about ±5 degrees.

In an illustrative embodiment, the absorption axis of the first polarizer and the absorption axis of the second polarizer, which are included in the device, may be perpendicular to each other. In this case, the transmission axes of the first and second polarizers may also be perpendicular to each other.

As the light source, for example, a direct type or edge type back light unit (BLU) that is typically used in a liquid crystal display (LCD) may be used. As the light source, various kinds of light sources may be used without limitation in addition to the aforementioned light sources.

The display element of the device may generate an image signal in a driving state, for example, an image signal including a two-dimensional image signal or a right-eye image signal (hereinafter, referred to as an R signal) and a left-eye image signal (hereinafter, referred to as an L signal). In an illustrative embodiment, the display element may include a right-eye image signal generating region (hereinafter, referred to as an UR region) that is capable of generating a two-dimensional image signal or an R signal and a left-eye image signal generating region (hereinafter, referred to as an UL region) that is capable of generating a two-dimensional image signal or an L signal in a driving state. In the display device, the image signal generating region is referred to as the UR region and the UL region. However, the display element may generate a two-dimensional image signal regardless of the name of the region.

The display element may be a region including a transmission type liquid crystal panel or a region formed by a liquid crystal layer of the liquid crystal panel. The transmission type liquid crystal panel may sequentially include, for example, a first substrate, a pixel electrode, a first alignment layer, a liquid crystal layer, a second alignment layer, a common electrode, and a second substrate from the light source side. An active type driving circuit including a thin film transistor (TFT) as a driving element in electrical contact with a transparent pixel electrode, an interconnection, and the like may be formed on the first substrate that is on the light source side. The pixel electrode may include, for example, indium tin oxide (ITO) and the like, and serve as an electrode in each pixel. In addition, the first or second alignment layer may include, for example, a material, such as polyimide and the like. The liquid crystal layer may include, for example, vertical alignment (VA), twisted nematic (TN), super twisted nematic (STN), or in plane switching (IPS) mode liquid crystals. The liquid crystal layer may serve to transmit or block light for each pixel from the light source by a voltage applied from the driving circuit. The common electrode may include, for example, ITO and the like, and serve as a common counter electrode.

The display element may include UR and UL regions formed by one or more pixels. For example, in the liquid crystal panel, a unit pixel including a liquid crystal sealed between the first and second alignment layers, or at least two unit pixels may be combined to form the UR or UL region.

Figure 3:
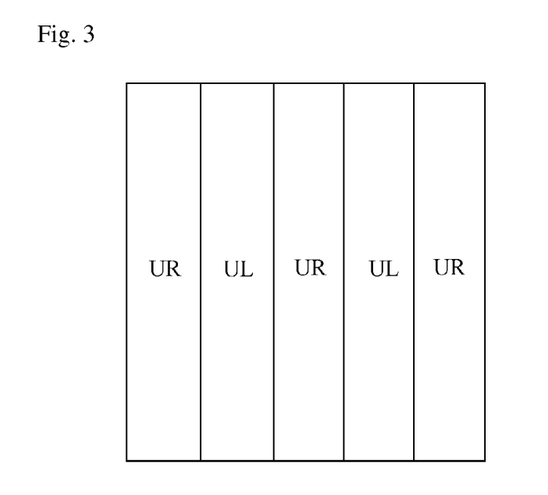
FIGS. 3 and 4 show schematics of illustrative embodiments of arrangements of the UR region and UL regions.
Figure 4:
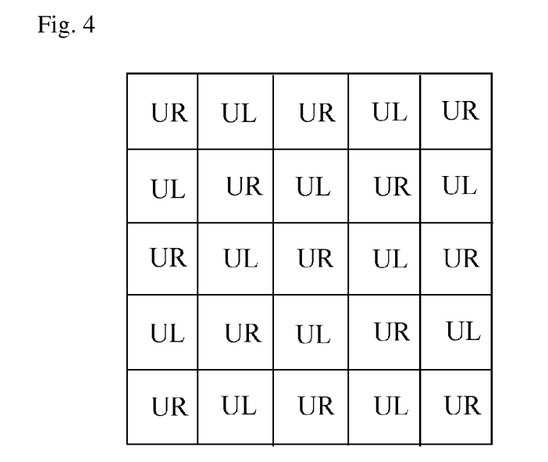

The UR and UL regions may be disposed in a row and/or column direction. FIG. 3 is a view illustrating the arrangement of the UR and UL regions. As in FIG. 3, the UR and UL regions may have a stripe shape extending in a common direction and may be alternately disposed adjacent to each other. FIG. 4 illustrates a different illustrative arrangement, and the UR and UL regions are alternately disposed adjacent to each other in a lattice pattern. The arrangement of the UR and UL regions is not limited to the arrangements of FIGS. 3 and 4, and various designs known in the art may be all applied.

The display element may generate a two-dimensional image signal or an image signal including R and L signals by driving pixels in each region according to signals in a driving state.

In an illustrative embodiment, a process in which the display element in the device generates an image signal including R and L signals will be described. For example, when light emitted from the light source is incident to the first polarizer, only light polarized in a direction parallel to the transmission axis of the first polarizer passes through the first polarizer. The passing light is incident to the display device, and then the light passing through the UR region may be converted into an R signal and the light passing through the UL region may be converted into an L signal. When the R and L signals are incident to the second polarizer, only a signal polarized in a direction parallel to the transmission axis of the second polarizer may pass through the second polarizer to be incident to the liquid crystal lens panel. In an illustrative embodiment of the present application, the polarized signal that passes through the second polarizer to be incident to the liquid crystal lens panel may be a linearly polarized signal. Furthermore, the linearly polarized signal may be polarized in a direction perpendicular to a helical axis of a cholesteric alignment region of the liquid crystal lens panel to be described below, and then incident to the liquid crystal lens panel.

In another illustrative embodiment, a process in which the display element in the device generates a two-dimensional image signal will be described. For example, when light emitted from the light source is incident to the first polarizer, only light polarized in a direction parallel to the transmission axis of the first polarizer passes through the first polarizer. When the passing light is incident to the display element to produce a two-dimensional image signal, light passing through the UR region and light passing through the UL region may be converted into two-dimensional image signals in the same manner. When the thus-generated two-dimensional image signals are incident to the second polarizer, only a signal polarized in a direction parallel to the transmission axis of the second polarizer may pass through the second polarizer to be incident to the liquid crystal lens panel.

The liquid crystal lens panel may include a lens layer. Furthermore, the lens layer may include a liquid crystal region formed by liquid crystal molecules.

Liquid crystal molecules in the liquid crystal region may exhibit a dielectric anisotropy ($\Delta\varepsilon \neq 0$). The term dielectric anisotropy in the present specification may mean that dielectric constants in a major axis direction and in a direction perpendicular to the major axis are different from each other.

When liquid crystal molecules have a dielectric anisotropy, the alignment of liquid crystal molecules may be changed according to a voltage applied to the lens layer and the intensity thereof. The dielectric anisotropy of liquid crystal molecules may have a positive or negative value. The fact that the dielectric anisotropy of liquid molecules has a positive value means that the dielectric constant in a major axis direction of liquid crystal molecules is larger than the dielectric constant in a minor axis direction thereof. Furthermore, the fact that the dielectric anisotropy of liquid molecules has a negative value means that the dielectric constant in a major axis direction of liquid crystal molecules is smaller than the dielectric constant in a minor axis direction thereof. In an illustrative embodiment, when liquid crystal molecules have a positive dielectric anisotropy, if a voltage is applied to the lens layer, the liquid crystal molecules may be re-aligned in a direction on which the voltage is applied.

In an illustrative embodiment, the liquid crystal region may be a region that can be switched between a cholesteric alignment region and a non-cholesteric alignment region.

Figure 5:
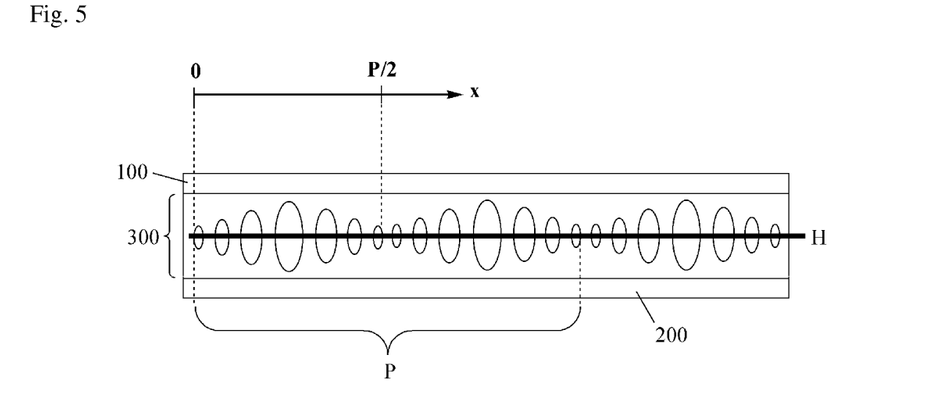
FIG. 5 shows a schematic of an illustrative embodiment of an illustrative cholesteric alignment region.

The cholesteric alignment region 300 may include cholesterically aligned liquid crystal molecules as in FIG. 5. The cholesterically aligned liquid crystal molecules have a helix type structure in which the liquid crystal molecules form a layer and a director of the liquid crystal molecules is aligned while being twisted along the helical axis (H). In the helix type structure, a distance until the director of liquid crystal molecules completes the rotation of 360 degrees is referred to as a pitch (P).

The cholesteric alignment state may be released while liquid crystal molecules are aligned in one direction by applying an appropriate voltage on the lens layer including the cholesteric alignment region at any time point, or removing the applied voltage. Furthermore, the cholesteric alignment state may be completely released, and then liquid crystal molecules in the liquid crystal region may be all aligned in the same direction. The region including liquid crystal molecules in such a state may be referred to as a non-cholesteric alignment region. That is, the non-cholesteric alignment region 300 may be a region in which the entire liquid crystal molecules are vertically aligned, horizontally aligned, or aligned at an angle therebetween.

The cholesteric alignment region and the non-cholesteric alignment region may switch between each other by the applied voltage. The regions may switch, for example, such that a cholesteric alignment region or a non-cholesteric alignment region is formed over the entire region. Therefore, when a voltage is applied to the region, the same voltage may be applied to the entire region or a region in which the alignment thereof is to be re-aligned. As a result, the patterning process of an electrode layer for implementing both optical anisotropy and isotropy may be omitted, and thus it is possible to manufacture a device using a simple method. Also, a lens layer may be manufactured by an existing method of manufacturing a liquid crystal panel.

In an illustrative embodiment, a lens layer in a non-voltage applied state may include a cholesteric alignment region. When a voltage enough to completely release the cholesteric alignment state is applied to the lens layer, the cholesteric alignment region may switch to the non-cholesteric alignment region. Furthermore, when the voltage applied to the lens layer including the non-cholesteric alignment region is removed, the region may switch to the cholesteric alignment region.

The cholesteric alignment region may be a planar alignment region, a homeotropic alignment region, or a focal conic alignment region. The planar alignment region may be a region in which the helical axis of the region is aligned vertically to the surface of the lens layer. The homeotropic alignment region may be a region in which the helical axis of the region is aligned parallel to the surface of the lens layer. Furthermore, the focal alignment region may be a region in which the helical axis of the region is aligned neither vertically nor parallel to the surface of the lens layer. In an illustrative embodiment, the cholesteric alignment region may be a homeotropic alignment region. The homeotropic alignment region may be formed such that the helical axis (H) of the region is parallel to the surface of the lens layer, as in FIG. 5.

The homeotropic alignment region may have a periodic refractive index distribution with respect to linearly polarized light that is perpendicular to the helical axis of the region. The region may have, for example, a refractive index distribution that uses a ½ pitch as a period. In an illustrative embodiment of the present application, the region may have a refractive index distribution of the following Equation 1.

$$n_{eff}(x)=n_e n_o/(n_e^2 \cos^2 \theta(x)+n_o^2 \sin^2 \theta(x))^{1/2}$$ [Equation 1]

In Equation 1, x is any number from 0 to P/2 as a coordinate of the cholesteric alignment region, where P is a pitch of the cholesteric alignment region, $n_{eff}(x)$ is a refractive index of the cholesteric alignment region with respect to the linearly polarized light at an x point, $n_e$ is an extraordinary refractive index of liquid crystal molecules in the cholesteric alignment region, $n_o$ is an ordinary refractive index of liquid crystal molecules in the cholesteric alignment region, and $\theta(x)$ is an angle of an optical axis of liquid crystal molecules at a coordinate corresponding to an optical axis of liquid crystal molecules at a point where x is 0.

The aforementioned x has a coordinate vale from 0 to P/2 as a coordinate in a direction parallel to the surface of the lens layer in the cholesteric alignment region, as in FIG. 5. The 0 is a coordinate at a point where the pitch of cholesterically aligned liquid crystal molecules begins, as in FIG. 5. In an illustrative embodiment, the point where the pitch begins may be a point where the major axis of the liquid crystal molecules is formed parallel to the surface of the lens layer. P/2 is a coordinate at a point where the cholesterically aligned liquid crystal molecules are rotated by 180 degrees.

The $\theta(x)$ is an angle of an optical axis of liquid crystal molecules at a coordinate (x) corresponding to an optical axis of liquid crystal molecules at a point where x is 0, and thus $\theta(0)$ is 0. Furthermore, the optical axis of liquid crystal molecules at a point where x is P/4 is rotated by 90 degrees from the optical axis of liquid crystal molecules at a point where x is 0, and thus $\theta(P/4)$ is $\pi/2$. In addition, the optical axis of liquid crystal molecules at a point where x is P/2 is rotated by 180 degrees from the optical axis of liquid crystal molecules at a point where x is 0, and thus $\theta(P/2)$ is $\pi$.

If $\theta(0)=0$, $\theta(P/4)=\pi/2$, and $\theta(P/2)=\pi$ are substituted into Equation 1, values of $n_{eff}(0)=n_{eff}(P/2)=n_o$ and $n_{eff}(P/4)=n_e$ may be obtained. That is, the cholesteric alignment region may have a refractive index distribution having an ordinary refractive index at 0 pitch and ½ pitch (P/2), and an extraordinary refractive index at ¼ pitch (P/4). The $n_{eff}(x)$ may be, for example, a refractive index measured at an x point with respect to linearly polarized light which has a wavelength of 550 nm and is perpendicular to the helical axis of the region.

When the refractive index distribution within the ½ pitch of the cholesteric alignment region is adjusted according to Equation 1, the region may serve as a lenticular lens. Therefore, L and R signals may be separately output through the cholesteric alignment region.

In an illustrative embodiment, the cholesteric alignment region may serve as a lens having a focal distance of 0.1 mm to 100 cm, 0.1 mm to 70 cm, 0.1 mm to 50 cm, 0.1 mm to 30 cm, or 0.1 mm to 10 cm, which is determined according to the following Equation 2.

$$F=P2/(32 \times d \times \Delta n)$$ [Equation 2]

In Equation 2, P is a pitch of the cholesteric alignment region, d is a thickness of the lens layer, and $\Delta n$ is a difference ($n_e-n_o$) between the extraordinary refractive index ($n_e$) and the ordinary refractive index ($n_o$) of liquid crystal molecules in the cholesteric alignment region.

The focal distance (F) may be, for example, a focal distance with respect to linearly polarized light that is perpendicular to the helical axis of the region. Such a focal distance may be controlled in consideration of, for example, the viewing distance of a 3D device. Also, the pitch or birefringence of the cholesteric alignment region, the thickness of the lens layer, and the like may be adjusted in order to control the focal distance (F).

The pitch of the cholesteric alignment region may be appropriately controlled in consideration of, for example, the pixel size of the display element of the 3D device and the like. In an illustrative embodiment, the pitch of the cholesteric alignment region may be controlled to a degree such as 0.1 µm to 10 cm, 0.1 µm to 5 cm, 0.1 µm to 3 cm, 0.1 µm to 1 cm, 0.1 µm to 5,000 µm, or 0.1 µm to 3,000 µm. When the pitch is controlled within the range, R and L signals transmitted from the display device may be separately output through the liquid crystal lens panel.

In addition, it is possible to control the difference ($n_e-n_o$) between the extraordinary refractive index ($n_o$) and the ordinary refractive index ($n_o$) of liquid crystal molecules in the cholesteric alignment region within a range of 0.01 to 0.6, 0.1 to 0.6, or 0.01 to 0.5 such that 3D images may be viewed without glasses in an appropriate distance. Also, in order to secure an appropriate viewing distance of the device, the thickness of the lens layer may be controlled to 0.1 µm to 100 µm, 0.1 µm to 50 µm, 0.1 µm to 30 µm, or 0.1 µm to 10 µm.

The liquid crystal lens panel may additionally include a base layer in which an electrode layer is formed on one surface thereof. Furthermore, the lens layer may be disposed adjacent to the electrode layer of the base layer.

Figure 6:
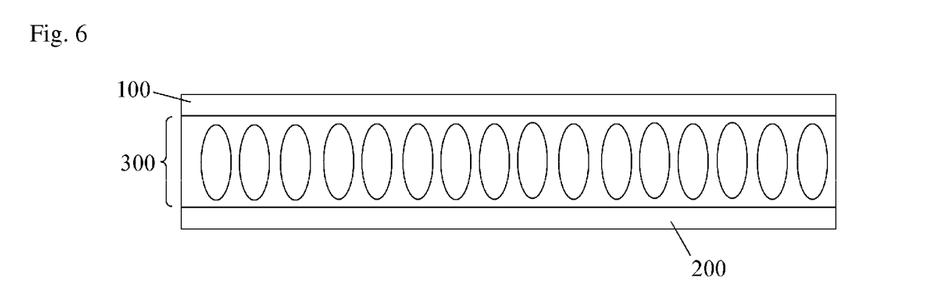
FIG. 6 shows a schematic of an illustrative embodiment of an illustrative non-cholesteric alignment region.

In an illustrative embodiment, the liquid crystal lens panel includes two base layers 100 and 200 disposed to face each other, as in FIGS. 5 and 6, an electrode layer is present at one surface of at least one base layer of the two base layers, and the lens layer 300 may be disposed to be in contact with the electrode layer between the base layers disposed to face each other. One of the two base layers may be referred to as a first base layer 100, and the other may be referred to as a second base layer 200. The two base layers may use the same base or different bases.

It is possible to use a base layer which is typically used in manufacturing a liquid crystal panel without limitation as the base layer. Examples of the base layer include a glass base layer, a plastic base layer, and the like. Examples of the plastic base layer include a sheet or film including: a cellulose resin, such as triacetyl cellulose (TAC), diacetyl cellulose (DAC), or the like; a cyclic olefin polymer (COP), such as a norbornene derivative and the like; an acryl resin, such as cyclic olefin copolymer (COC), poly(methyl methacrylate) (PMMA), and the like; polycarbonate (PC); a polyolefin, such as polyethylene (PE), polypropylene (PP), or the like; polyvinyl alcohol (PVA); poly ether sulfone (PES); polyetheretherketone (PEEK); polyetherimide (PEI); polyethylenenaphthalate (PEN); a polyester, such as polyethyleneterephthalate (PET) and the like; polyimide (PI); polysulfone (PSF); or a fluorine resin, and the like. The plastic base layer may be optically isotropic or anisotropic.

The base layer may include a UV blocking agent or UV absorbent. When the base layer includes the UV blocking agent or absorbent, deterioration of the lens layer due to UV rays may be prevented. Examples of the UV blocking agent or absorbent include organic materials, such as salicylic acid ester compounds, benzophenone compounds, oxybenzophenone compounds, benzotriazol compounds, cyanoacrylate compounds, or benzoate compounds, or inorganic materials, such as zinc oxide or a nickel complex salt, and the like. A content of the UV protector or absorbent in the base layer is not particularly limited and may be appropriately selected in consideration of a desired effect. For example, during the process of manufacturing the plastic base layer, the UV protector or absorbent may be included in a weight ratio of about 0.1% by weight to about 25% by weight in a weight ratio based on a main material of the base layer.

A thickness of the base layer is not particularly limited but may be appropriately adjusted according to the desired use. The base layer may have a monolayer structure or a multi-layer structure.

As the electrode layer present at one surface of the base layer, for example, a transparent conductive electrode, such as indium tin oxide (ITO) and the like may be used.

The liquid crystal lens panel may additionally include an alignment layer between the base layer and the lens layer. As the alignment layer, it is possible to use a typical alignment layer known in the art, for example, a photo alignment layer, an alignment layer formed by a (nano) imprinting method, a rubbing alignment layer, or the like. The alignment layer has an arbitrary configuration, and it is also possible to impart an alignment property to the base layer by directly rubbing or stretching the base layer without using the alignment layer.

In an illustrative embodiment, when the cholesteric alignment region is a homeotropic alignment region, a vertical alignment layer may be used as the alignment layer. The vertical alignment layer may be an alignment layer which may impart an alignment property such that liquid crystal molecules adjacent to each other are aligned in a direction vertical to the surface of the vertical alignment layer.

The liquid crystal lens panel may be formed by a method known in the art in order to satisfy the aforementioned conditions. The panel may be manufactured, for example, by facing two base layers with each other such that the electrode layer faces the base layer, injecting a liquid crystal composition between the two base layers, and aligning liquid crystal molecules to form a lens layer.

The liquid crystal composition may include all kinds of compositions, which may be used in order to form a cholesteric alignment region.

In an illustrative embodiment, the composition may include nematic liquid crystal molecules and a chiral agent. Nematic liquid crystal molecules are typically aligned in a long axis direction, do not form a layer, and are aligned in a state where the positions thereof are irregular. A desired helical pitch may be caused by adding a chiral agent to the nematic liquid crystal molecules. At this time, the helical pitch may be adjusted according to the following Equation 3.

$$P = 1/P_t \cdot c \quad \text{[Equation 3]}$$

In Equation 3, $P_t$ is a twisting power, and c is a molar concentration of the chiral agent. Accordingly, when a chiral agent having a high twisting power is used, or the content of the chiral agent is adjusted to a high level, the pitch of the chiral nematic liquid crystal molecules may be made short.

As the nematic liquid crystal molecules, those used in the art may be used without limitation. Examples of the liquid crystal molecules include compounds represented by the following Formula 1.

[Formula 1]

In Formula 1, A is a single bond, —COO—, or —OCO—, each of $R_1$ to $R_{10}$ is independently hydrogen, a halogen, an alkyl group, an alkoxy group, an alkoxycarbonyl group, a cyano group, a nitro group, —U-Q-P, or a substituent of the following Formula 2, or a pair of two adjacent substituents among $R_1$ to $R_5$ or a pair of two adjacent substituents among $R_6$ to $R_{10}$ are joined together to form a benzene substituted with —U-Q-P, where U is —O—, —COO—, or —OCO—, Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

[Formula 2]

In Formula 2, B is a single bond, —COO—, or —OCO—, each of $R_{11}$ to $R_{15}$ is independently hydrogen, a halogen, an alkyl group, an alkoxy group, an alkoxycarbonyl group, a cyano group, a nitro group, or —U-Q-P, or a pair of two adjacent substituents among $R_{11}$ to $R_{15}$ or are joined together to form a benzene substituted with —U-Q-P, where U is —O—, —COO—, or —OCO—, Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

In Formulas 1 and 2, the fact that two adjacent substituents are joined together to form a benzene substituted with —U-Q-P may mean that two adjacent substituents are joined together to form a naphthalene backbone entirely substituted with —U-Q-P.

The symbol on the left of B in Formula 2 may mean that B is directly bound to the benzene of Formula 1.

The term "single bond" in Formulae 1 and 2 means the case in which no separate atom is present at a part represented by A or B. For example, when A in Formula 1 is a single bond, benzene rings disposed on both sides of A may be directly bound to each other to form a biphenyl structure.

Examples of the halogen in Formulas 1 and 2 may include fluorine, chlorine, bromine, iodine, or the like.

In the present specification, unless otherwise defined, the term "alkyl group" may refer to a linear or branched alkyl group having 1 to 20 carbon atoms, 1 to 16 carbon atoms, 1 to 12 carbon atoms, 1 to 8 carbon atoms, or 1 to 4 carbon atoms, or a cycloalkyl group having 3 to 20 carbon atoms, 3 to 16 carbon atoms, or 4 to 12 carbon atoms. The alkyl group may be arbitrarily substituted with one or more substituents.

In the present specification, unless otherwise defined, the term "alkoxy group" may mean refer to an alkoxy group having 1 to 20 carbon atoms, 1 to 16 carbon atoms, 1 to 12 carbon atoms, 1 to 8 carbon atoms, or 1 to 4 carbon atoms. The alkoxy group may be linear, branched, or cyclic. In addition, the alkoxy group may be arbitrarily substituted with one or more substituents.

Also, in the present specification, unless otherwise defined, the term "alkylene group or alkylidene group" may refer to an alkylene group or alkylidene group having 1 to 12 carbon atoms, 4 to 10 carbon atoms, or 6 to 9 carbon atoms. The alkylene group or alkylidene group may be linear, branched, or cyclic. In addition, the alkylene group or alkylidene group may be arbitrarily substituted with one or more substituents.

Also, in the present specification, unless otherwise defined, the alkenyl group may refer to an alkenyl group having 2 to 20 carbon atoms, 2 to 16 carbon atoms, 2 to 12 carbon atoms, 2 to 8 carbon atoms, or 2 to 4 carbon atoms. The alkenyl group may be linear, branched, or cyclic. In addition, the alkenyl group may be arbitrarily substituted with one or more substituents.

In an illustrative embodiment, P in Formulas 1 and 2 may be an acryloyl group, a methacryloyl group, an acryloyloxy group, or a methacryloyloxy group.

In Formulas 1 and 2, when —U-Q-P or a residue of Formula 2 is included, the —U-Q-P or the residue of Formula 2 may be present in, for example, a position of $R_1$, $R_8$, or $R_{13}$, and for example, one or two of the —U-Q-P or the residue of Formula 2 may be present. Also, in the compound of Formula 1 or the residue of Formula 2, examples of the substituent other than —U-Q-P or the residue of Formula 2 may include hydrogen, a halogen, a linear or branched alkyl group having 1 to 4 carbon atoms, a cycloalkyl group having 4 to 12 carbon atoms, a cyano group, an alkoxy group having 1 to 4 carbon atoms, or a nitro group. In another illustrative embodiment of the present application, examples of the substituent other than —U-Q-P or the residue of Formula 2 may include chlorine, a linear or branched alkyl group having 1 to 4 carbon atoms, a cycloalkyl group having 4 to 12 carbon atoms, an alkoxy group having 1 to 4 carbon atoms, or a cyano group.

In the present specification, examples of the substituent that may be substituted with a specific compound or a functional include an alkyl group, an alkoxy group, an alkenyl group, an epoxy group, an oxo group, an oxetanyl group, a mercapto group, a cyano group, a carboxyl group, an acryloyl group, a methacryloyl group, an acryloyloxy group, a methacryloyloxy group, an aryl group or the like, but are not limited thereto.

Any chiral agent may be used without any particular limitation as long as the chiral agent may cause a desired helical pitch without impairing liquid crystal properties of the liquid crystals, for example, nematic regularity. The chiral agent for causing helical pitch to the liquid crystals needs to include at least chirality in the molecular structure. Examples of the chiral agent may include compounds having one or at least two asymmetric carbon atoms, compounds having an asymmetric point on a heteroatom, such as chiral amine, chiral sulfoxide, or the like, or compounds having an axially asymmetric and optically active site, such as cumulene, binaphthol, or the like. Examples of the chiral agent may include low-molecular compounds having a molecular weight of 1,500 or less. For examples, as the chiral agent, it is also possible to use commercially available chiral nematic liquid crystals, for example, S-811 available from Merck & Co. Inc., LC756 of BASF Co., and the like.

The chiral agent may be in a ratio of 1 to 10 parts by weight based on 100 parts by weight of the compound of Formula 1. The helical twisting of the cholesteric alignment region may be effectively induced by adjusting the content of the chiral agent as described above. In the present specification, unless otherwise defined, the unit part by weight may refer to a ratio of the weight.

The cholesteric alignment liquid crystal composition may be typically a part of a coating composition including one or more solvents. Examples of a solvent may include: halogenated hydrocarbons, such as chloroform, dichloromethane, tetrachloroethane, trichloroethylene, tetrachloroethylene, chlorobenze, and the like; aromatic hydrocarbons, such as benzene, toluene, xylene, methoxybenzene, 1,2-dimethoxybenzene, and the like; alcohols, such as methanol, ethanol, propanol, isopropanol, and the like; ketone-based solvents, such as acetone, methyl ethyl ketone, methyl isobutyl ketone, cyclohexanone, cyclopentanone, and the like; cellosolves, such as methyl cellosolve, ethyl cellosolve, butyl cellosolve, and the like; ethers, such as diethylene glycol dimethyl ether (DEGDME), dipropylene glycol dimethyl ether (DPGDME), and the like; and the like. In addition, the content of the solvent is not particularly limited, and may be appropriately selected in consideration of coating efficiency, drying efficiency, and the like.

In the liquid crystal composition or a coating composition including the same, a polymerizable monomer, a polymer, a dispersant, an initiator, a crosslinking agent, a surfactant, an antioxidant, an ozone inhibitor, and the like may be additionally blended within a range that does not disturb the alignment of liquid crystal molecules in addition to the aforementioned components. Additionally, if a coating composition is desired, various dyes and pigments may be included in order to absorb UV rays, IR rays, or visible rays. In some cases, it may be appropriate to add a viscosity modifier, such as a thickener and a filler, thereto.

The cholesteric alignment liquid crystal composition may be injected between the two base layers by, for example, various liquid crystal injection methods. Furthermore, the liquid crystal molecules of the injected liquid crystal composition may be aligned to form a lens layer. Aligning liquid crystal molecules may be performed by, for example, the aforementioned alignment layer.

The liquid crystal lens panel may re-align the alignment of liquid crystal molecules according to the application of voltage. In an illustrative embodiment of the present application, in a state where the lens layer includes a cholesteric alignment region as in FIG. 5, light passing through the region may be separately emitted according to the position of the incident light. In another embodiment of the present application, in a state where the lens layer includes a non-cholesteric alignment region, light passing through the region may be emitted as it is regardless of the position of the incident light. Accordingly, the device may control the alignment of the region to display both a two-dimensional image (2D image) and a three-dimensional image (3D image).

The liquid crystal lens panel, as in FIGS. 1 and 2, may be disposed to enable light transmitted from the display element to be transmitted. Also, the liquid crystal panel may be aligned such that the ½ pitch of the cholesteric alignment region corresponds to a pair of the UR and UL regions of the display element, as in FIG. 1. The alignment in which the ½ pitch of the cholesteric alignment region corresponds to a pair of the UR and UL regions means an alignment in which an image signal generated from a pair of the UR and UL regions may be incident within the ½ pitch of the cholesteric alignment region, and does not necessarily mean that a pair of UR and UL regions and the ½ pitch of the cholesteric alignment region are formed with the same position and size.

The liquid crystal lens panel may exhibit properties of optical anisotropy and optical isotropy with respect to linearly polarized light in a direction perpendicular to the helical axis of the cholesteric alignment region according to the application of voltage. Accordingly, the device may show two-dimensional images, or three-dimensional images according to the application of voltage on the liquid crystal lens panel.

A driving process that the device exhibits three-dimensional images will be described. As in FIG. 1, the liquid crystal panel 10 may include a cholesteric alignment region in a state where three-dimensional images are shown. Furthermore, a polarized signal passing through the second polarizer may be polarized to be incident to the liquid crystal lens panel such that the polarization direction of the signal is perpendicular to the helical axis of the region. Accordingly, R and L signals generated from the UR and UL regions of the display element 20 may be separated from the cholesteric alignment region to be output to a different direction. In an illustrative embodiment of the present application, the R signal generated from the UR region and the L signal generated from the UL region may be separated while passing through the cholesteric alignment region. Furthermore, the R signal passing through the liquid crystal region may be incident to the right eye (HR) of an observer, and the L signal passing through the liquid crystal region may be incident to the left eye (HL) of the observer. Therefore, the observer may observe three-dimensional images without wearing special glasses, for example, shutter glass type glasses, polarization glasses, or the like.

In addition, a driving process that the device exhibits two-dimensional images will be described. As in FIG. 2, the liquid crystal lens panel 10 may include a non-cholesteric alignment region in a state where the display element 20 shows two-dimensional images. That is, the liquid crystal lens panel may include a region having an optical isotropy with respect to linearly polarized light that is perpendicular to the helical axis of the cholesteric alignment region in a driving state where two-dimensional images are shown. Accordingly, a two-dimensional image signal generated from the UR and UL regions of the display element 20 may pass through the isotropic region directly. As a result, the observer may observe two-dimensional images.

The device may be implemented by a configuration and a method, which are typically adopted in the art, except that both a two-dimensional image and a three-dimensional image may be displayed by applying a liquid crystal lens panel.

An illustrative display device of the present application may display three-dimensional images or two-dimensional images, which may be enjoyed without glasses.

Effect

An illustrative display device of the present application may display three-dimensional images or two-dimensional images, which may be enjoyed without glasses.

ILLUSTRATIVE EMBODIMENTS

Hereinafter, illustrative embodiments of the present application will be described in detail. However, the present application is not limited to the embodiments disclosed below but can be implemented in various forms. The following embodiments are described in order to enable those of ordinary skill in the art to embody and practice the present application.

Hereinafter, the display device will be described in more detail with reference to Example. However, the device is not limited by the Example suggested.

EXAMPLE (1) Preparation of Cholesteric Alignment Liquid Crystal Composition

As a cholesteric alignment liquid crystal composition, a composition including liquid crystal molecules having a difference ($n_e - n_o$) between an extraordinary refractive index ($n_e$) and an ordinary refractive index ($n_o$) of about 0.2 was used.

(2) Manufacture of Liquid Crystal Lens Panel and Display Device

A liquid crystal lens panel was manufactured by using an electrode substrate in which a vertical alignment layer generally used in the manufacture of a liquid crystal panel was formed (a base layer with an electrode layer formed at one surface thereof). Specifically, the liquid crystal lens panel was manufactured by disposing two substrates including the electrode substrate to face each other at an interval of about 4.1 μm, injecting the cholesteric alignment liquid crystal composition, and cholesterically aligning liquid crystal molecules.

The lens layer of the liquid crystal lens panel includes a homeotropically aligned cholesteric alignment region in a state where voltage was not applied, as in FIG. 5. The cholesteric alignment region had a pitch (P) of about 600 μm, and the lens layer 300 had a thickness of about 4.1 μm. When liquid crystal molecules had dielectric anisotropy and then voltage was applied, liquid crystal molecules were aligned in a direction according to the applied voltage, and thus a non-cholesteric alignment liquid crystal region was formed, as in FIG. 6. A display device was manufactured by applying the manufactured liquid crystal lens panel to a typical 3D device of lenticular lens type as a lenticular lens.

Experimental Example

When the liquid crystal lens panel in the display device included a homeotropically aligned cholesteric alignment region, it was evaluated by the following method whether a three-dimensional image may be enjoyed without special glasses.

Figure 7:
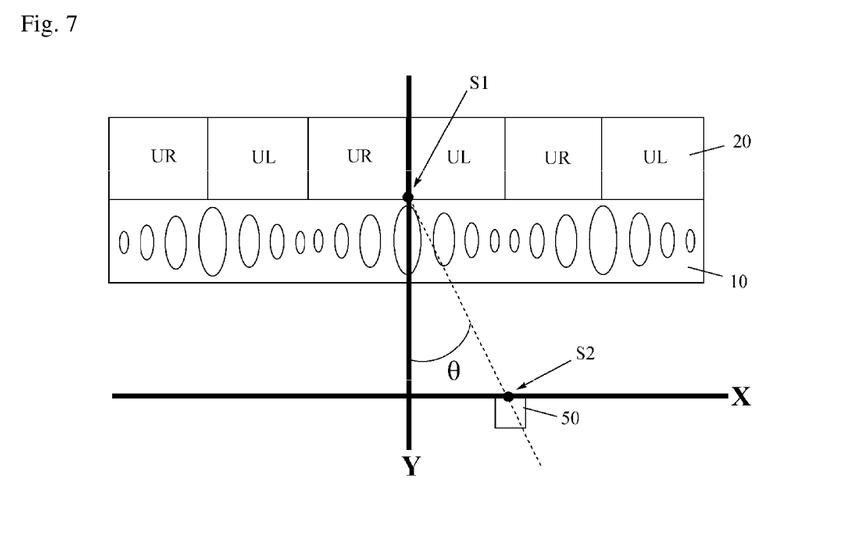
FIG. 7 shows a schematic of an illustrative embodiment of the method of evaluating whether the display device separately outputs L and R signals in Example.

First, a brightness measuring meter (SR-UL2 Spectrometer, 50) was disposed at an observation point (any point in contact with the X line of FIG. 7) from which the display device was capable of being observed as in FIG. 7. Subsequently, brightness was measured by the brightness measuring meter in a state where the device allowed the L signal to be output. While maintaining the distance with the device, brightness in each case was measured while moving the brightness measuring meter 50 in a horizontal direction along the X line in FIG. 7. The brightness in each case was measured, and the brightness was defined as the intensity of the L signal at each point. Likewise, brightness in each case was measured while moving the brightness measuring meter in a state where the device allowed the R signal to be output. Furthermore, the brightness was defined as the intensity of the R signal at the point.

Figure 8:
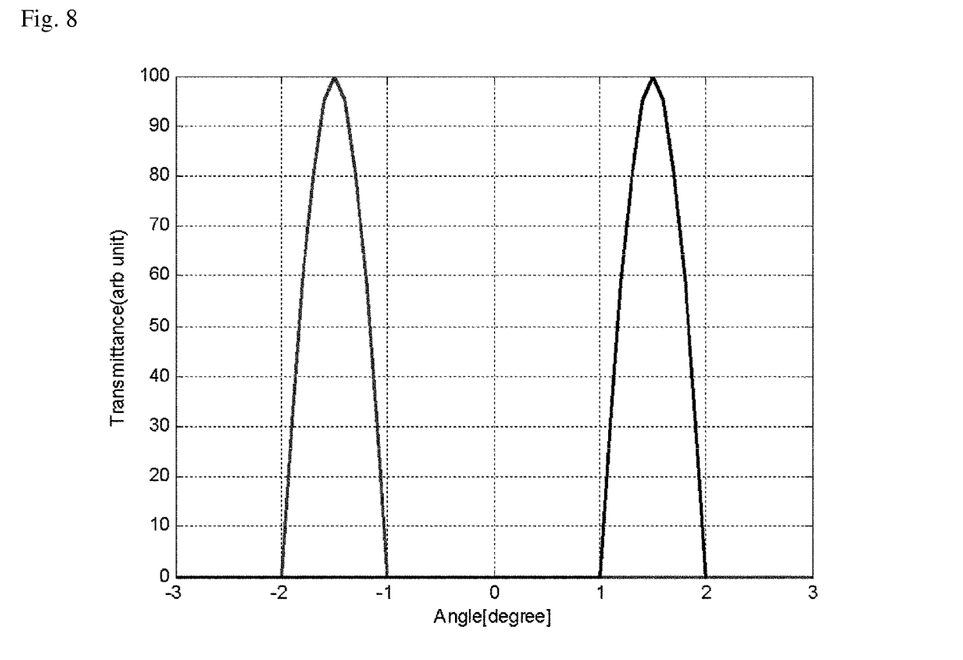
FIG. 8 is a graph showing that the display device in Example separately outputs L and R signals.

The intensities of L and R signals at each point are shown in Table 1 and FIG. 8.

The measured angle (A) in the following Table 1 is defined as an angle between a virtual line connecting a point (S1) at which the Y line is in contact with the surface of the display element and a central point (S2) of the brightness measuring meter, and the Y line. Furthermore, when the brightness measuring meter was present on the right side of the Y line, the measured angle was defined as a positive value, and when the brightness measuring meter was present on the left side of the Y line, the measured angle was defined as a negative value. The above Y line passes through the center of the device and may be defined as a normal line with respect to the surface of the device.

TABLE 1

| Measured angle (unit: degree) | Intensity of L signal | Intensity of R signal |
|---|---|---|
| −3 | 0 | 0 |
| −2.9 | 30.9017 | 0 |
| −2.8 | 58.7785 | 0 |
| −2.7 | 80.9017 | 0 |
| −2.6 | 95.1057 | 0 |
| −2.5 | 100 | 0 |
| −2.4 | 95.1057 | 0 |
| −2.3 | 80.9017 | 0 |
| −2.2 | 58.7785 | 0 |
| −2.1 | 30.9017 | 0 |
| −2 | 0 | 0 |
| 2 | 0 | 0 |
| 2.1 | 0 | 30.9017 |
| 2.2 | 0 | 58.7785 |
| 2.3 | 0 | 80.9017 |
| 2.4 | 0 | 95.1057 |
| 2.5 | 0 | 100 |
| 2.6 | 0 | 95.1057 |
| 2.7 | 0 | 80.9017 |
| 2.8 | 0 | 58.7785 |
| 2.9 | 0 | 30.9017 |
| 3 | 0 | 0 | a, b: The intensities of L and R signals are relative intensities when the intensity of the signal is defined as 100 at a point where the maximum brightness is measured.

What is claimed is:

1. A display device comprising:
   a display element configured to emit an image signal comprising a right-eye image signal and a left-eye image signal; and
   a liquid crystal lens panel that comprises a lens layer comprising a liquid crystal region formed by a liquid crystal molecule, that is configured to be convertible between a homeotropically aligned cholesteric alignment region and a non-cholesteric alignment region, and that is positioned such that the image signal emitted from the display element can be incident thereon,
   wherein the lens layer in a non-voltage applied state includes the homeotropically aligned cholesteric alignment region, and wherein the homeotropically aligned cholesteric alignment region switches to the non-cholesteric alignment region when a voltage is applied to the lens layer.

2. The display device of claim 1, wherein the liquid crystal lens panel is positioned such that a pair of the right-eye and left-eye image signals emitted from the display element can be incident on a region corresponding to a half pitch of the cholesteric alignment region.

3. The display device of claim 1, wherein the cholesteric alignment region exhibits a distribution according to the following Equation 1 of refractive indices index distribution with respect to light that is linearly polarized in a direction perpendicular to a helical axis of the region:

$$n_{eff}(x)=n_e n_o/(n_e^2 \cos^2 \theta(x)+n_o^2 \sin^2 \theta(x))^{1/2}$$ [Equation 1]

wherein, x is any number from 0 to P/2 as a coordinate of the cholesteric alignment region, where P is a pitch of the cholesteric alignment region, $n_{eff}(x)$ is a refractive index of the cholesteric alignment region with respect to the linearly polarized light at an x point, $n_e$ is an extraordinary refractive index of liquid crystal molecules, $n_o$ is an ordinary refractive index of liquid crystal molecules, and θ(x) is an angle of an optical axis of liquid crystal molecules at a coordinate corresponding to an optical axis of liquid crystal molecules at a point where x is 0.

4. The display device of claim 1, wherein the cholesteric alignment region has a focal distance F in the range from 0.1 mm to 100 cm, the focal distance F being defined according to the following Equation 2:

$$F=P^2/(32 \times d \times \Delta n)$$ [Equation 2]

wherein, P is a pitch of the cholesteric alignment region, d is a thickness of the lens layer, and Δn is a difference $(n_e - n_o)$ between the extraordinary refractive index $(n_e)$ and the ordinary refractive index $(n_o)$ of the liquid crystal molecules.

5. The display device of claim 1, wherein the liquid crystal molecules have a positive or negative dielectric anisotropy.

* * * * *